(12) United States Patent
Ishizuka

(10) Patent No.: US 7,248,759 B2
(45) Date of Patent: Jul. 24, 2007

(54) OPTICAL SIGNAL SWITCHING APPARATUS, AND CONTROLLER AND METHOD FOR CONTROL OF OPTICAL SWITCH

(75) Inventor: Atsuo Ishizuka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/048,690

(22) Filed: Feb. 2, 2005

(65) Prior Publication Data

US 2005/0129344 A1    Jun. 16, 2005

Related U.S. Application Data

(63) Continuation of application No. PCT/JP02/12666, filed on Dec. 3, 2002.

(51) Int. Cl.
*G02B 6/26*    (2006.01)

(52) U.S. Cl. ............... 385/16; 385/17; 385/18

(58) Field of Classification Search .......... 385/16, 385/17, 18
See application file for complete search history.

(56) References Cited

U.S. PATENT DOCUMENTS

| 5,802,223 | A | 9/1998 | Nashimoto | 385/8 |
|---|---|---|---|---|
| 6,400,855 | B1 * | 6/2002 | Li et al. | 385/4 |
| 2002/0114556 | A1 | 8/2002 | Kato et al. | 385/16 |
| 2003/0081283 | A1 * | 5/2003 | Ishizuka et al. | 359/124 |

FOREIGN PATENT DOCUMENTS

| EP | 1116977 A2 | 7/2001 |
|---|---|---|
| JP | 6-118454 | 4/1994 |
| JP | 6-139270 | 5/1994 |
| JP | 9-5797 | 1/1997 |
| JP | 2000-180905 | 6/2000 |
| JP | 2001-196669 | 7/2001 |
| JP | 3294373 | 4/2002 |
| JP | 2002-318398 | 10/2002 |

OTHER PUBLICATIONS

Hiroshi Konno, et al., "Hisenkei Keikakuho", JUSE Press, Ltd., ISBN4-8171-5306-7, Mar. 10, 1978, pp. 280-281, Section 12.2.
I.N. Bronstein, et al., "Sugaku Handbook", Morikita Shuppan Co., Ltd., ISBN 4-627-05080-1, Nov. 6, 1985, pp. 195-196, Section 3.
Yves-Alain Peter, et al., "Micro-Optical Fiber Switch for a Large Number of Interconnects Using a Deformable Mirror", IEEE Photonics Technology Letters, vol. 14, No. 3, Mar. 2002.

(Continued)

*Primary Examiner*—Jennifer Doan
(74) *Attorney, Agent, or Firm*—Staas & Halsey LLP

(57) ABSTRACT

In controlling an optical switch that includes an incoming light deflection section to deflect incoming light from a predetermined input port in an arbitrary direction, and an outgoing light deflection section to deflect outgoing light from the incoming light deflection section in an arbitrary direction and couple the outgoing light to a predetermined output port, a monitoring section monitors optical coupling efficiency of the outgoing light into the output port and controller controls deflection characteristics of the deflection sections so that the monitored optical coupling efficiency is maximized. Therefore, even when optimal controlled variables for the optical switch are displaced due to temperature drift and/or drift over time, the time taken to find the optimal controlled variables can be significantly reduced and rapid switching of optical paths can be achieved.

18 Claims, 14 Drawing Sheets

OTHER PUBLICATIONS

N. M. Beach, et al., "An Experimental Feedback Loop for Implementing Coherent Control Based on the Genetic Algorithm", Technical Digest. Summaries of Papers Presented at the International Quantum Electronics Conference. (IQEC '98). May 4, 1998, pp. 1-2.

Hirokazu Nosato, et al., "Evolvable Optical Systems and Their Applications", IN: Lecture Notes in Computer Science 2210, Evolvable Systems: From Biology to Hardware. 4th International Conference, ICES 2001, Tokyo, Japan Proceedings, Oct. 2001, pp. 327-339.

* cited by examiner

OPTICAL SIGNAL SWITCHING APPARATUS, AND CONTROLLER AND METHOD FOR CONTROL OF OPTICAL SWITCH

CROSS REFERENCE TO RELATED APPLICATIONS

This application is a continuation application, filed under 35 USC 111(a), of International Application PCT/JP02/12666, filed Dec. 3, 2002.

BACKGROUND OF THE INVENTION

1. Field of the Invention

The present invention relates to an optical cross-connect apparatus, optical add/drop switch used in a high speed and high capacity WDM (Wavelength Division Multiplexing) system, and to a controller and method for control of an optical switch used in a wavelength router etc.

2. Description of the Related Art

A WDM scheme is promising means to establish a high capacity optical communication network and traffic in the network is dramatically increasing as use of the Internet is recently and rapidly spreading all over the world. An optical cross-connect (OXC) system in a backbone optical network is able to automatically and immediately provide transmission via a redundant fiber optic network or alternative fiber optic network upon fiber failure in order to rapidly recover the system and further has capability of determining how to distribute optical paths for individual wavelengths and converting one wavelength to another.

FIG. 5 illustrates schematically an example of an OXC system. The OXC system shown in FIG. 5 includes a plurality of optical nodes (optical signal switching apparatuses) 100 connected in a mesh and each optical node 100 is configured to include, for example, a preamplifier 101, demultiplexer (optical branching filter) 102, optical switch 103, multiplexer (optical multiplexer) 104 and post amplifier (Erbium Doped Fiber Amplifier: EDFA) 105, etc.

It should be noted that the preamplifier 101 is for amplifying a WDM signal received from an input optical transmission line to a predetermined level for all wavelengths of interest and the demultiplexer 102 is for demultiplexing the WDM signal output from the preamplifier 101 into light signals of different wavelengths (on different channels). Note that the preamplifier 101 and demultiplexer 102 are respectively provided for individual input optical transmission lines accommodated in the optical node 100.

Further, the optical switch 103 is for receiving, through a given input port, outgoing light signals of different wavelengths output from the demultiplexer 102 and outputting the signals to an arbitrary output port, thereby cross-connecting the input light signals in units of wavelengths.

Additionally, the multiplexer 104 is for wavelength-multiplexing the outgoing light signals of different wavelengths output from the optical switch 103 and outputting a WDM signal, and the post amplifier 105 is for amplifying the WDM signal from the multiplexer 104 to a predetermined level for all wavelengths of interest in order to provide transmission to the next optical node. Note that also the multiplexer 104 and post amplifier 105 are respectively provided for individual output optical transmission lines.

In accordance with such a configuration, each of the optical nodes 100 operates so that a WDM signal received from a certain input transmission line is demultiplexed into light signals (hereinafter, referred to also as channel signals) of respective wavelengths by the demultiplexer 102 and then the light signals are cross-connected in individual wavelengths by the optical switch 103. Accordingly, the channel signal input to an arbitrary input port of the optical switch 103 can be output to an arbitrary output port, i.e., an arbitrary output optical transmission line.

An example of a known OXC system includes, besides the above-stated system, an optical add/drop (Optical Add/Drop Multiplexing: OADM) ring system, as exemplarily shown in FIG. 6. The ring system is often employed in networks within a metropolitan area and a prefectural area, and has an ability to arbitrarily add and drop light signals without converting the signals of respective wavelengths to corresponding electrical signals.

It should be noted that the optical node 100 constituting a ring system shown in FIG. 6 can be configured to implement functions similar to those of said optical node 100 described in connection with FIG. 5 and in this case, the optical node is also configured to include, for example, a preamplifier 101, demultiplexer (optical branching filter) 102, optical switch 103, multiplexer (optical multiplexer) 104 and post amplifier (EDFA) 105, etc.

Moreover, in this case, it becomes possible that an outgoing light signal from a SONET (Synchronous Optical NETwork) transmission apparatus 200 or downstream router 300 (i.e., router on the side of a tributary) is added to a WDM signal transmitted over the ring system using an idle wavelength by a cross-connect operation performed in individual wavelengths in the optical switch 103, or in contrast to it, a light signal of an arbitrary wavelength is dropped from a WDM signal transmitted over the ring system and routed to a SONET transmission apparatus 200 or router 300.

Accordingly, when traffic increases on a certain site, dynamically changing assignment of wavelengths increases a bandwidth automatically to thereby increase transmissible capacity, meaning that a network configuration can be automatically altered depending on the degree of how a user is utilizing a network.

It should be noted that mainstream of the existing optical switch 103 is a switch of the type in which a light signal is first converted to an electric signal, a signal destination is switched and then again the signal is converted back to a light signal. However, when a data transmission rate is in excess of 10 Gb/s (gigabits per second) and further the number of channels increases, technique assuming the principle of opto-electric conversion cannot address the need for reduction in data transmission rate and apparatus size, and therefore, there arises a need for development of an OXC/OADM apparatus which does not depend on speed of a light signal.

Currently, an optical switch module is implemented which has a number 32 of input ports and a number 32 of output ports (32×32 channels) and an example can also be found in the Configuration of Non-Blocking Multiconnection Switching Networks (optional switch 103), in which a number of such switch modules are connected in series.

In more detail, some of optical switching devices incorporate a movable micro-mirror therein. That is, the device operates so that the orientation of the micro-mirror is controlled by an electrostatic force or electromagnetic force in order to switch the direction of a propagating light signal. Note that the above micro-mirror is formed using MEMS (Micro Electro Mechanical System) technology. The optical switch module is then constructed by two dimensionally arranging (i.e., in x- and y-directions) a number of micro-mirrors.

In contrast to such a mechanical optical switch with a micro-mirror, a non-mechanical optical switch without a movable part has also been proposed. For example, a switching device (optical deflection element) using an electro-optic effect is disclosed such as in Japanese Patent Laid-Open No. HEI9-5797 (hereinafter, referred to as Patent Document 1). FIG. 7A is a schematic plan view illustrating an optical deflection element according to this Patent Document 1 and FIG. 7B is a view of the device in a direction of an arrow A.

As shown in these FIGS. 7A and 7B, the optical deflection device disclosed in Patent Document 1 is configured so that an optical waveguide 402 with an electro-optic effect is formed on a conductive or semi-conductive single crystal substrate 401 and an upper electrode 403 is formed thereon.

Further, the upper electrode (prism electrode) 403 is formed in the shape (tapered shape) of a wedge (right triangle) having a side (hereinafter, referred to as a bottom) 403a orthogonal to an optical axis of incoming light and a side (hereinafter, referred to as an oblique line) 403b obliquely intersecting the optical axis.

In the optical deflection element constructed as described above, light enters the optical waveguide 402 from the side of the bottom 403a of the upper electrode 403 and exits the oblique line 403b of the upper electrode 403. Then, when a voltage is applied between the substrate 401 as a lower electrode and the upper electrode 403, the refractive index of a region of the optical waveguide 402 below the upper electrode 403 is changed, causing the refractive index of that region to become different from that of the surrounding region. This, in turn, causes light propagating through the waveguide 402 to be refracted by the region corresponding to the change in the refractive index, thereby changing the direction of light propagation. That is, changing a voltage applied between the upper electrode 403 and the substrate 401 allows control of the direction of outgoing light.

Moreover, as described, for example, in Japanese Patent Laid-Open No. 2002-318398 (hereinafter, referred to as Patent Document 2), a proposal has also been made to dispose the above upper electrode 403 on incoming and outgoing sides so that these electrodes face each other, in order to downsize an optical switch that uses an electric electro-optic effect.

FIG. 8 is a schematic plan view of an optical switch module (hereinafter, referred to also as a known example 2) proposed in such Patent Document 2 and the optical switch module shown in FIG. 8 is configured to include an optical waveguide section 501 on the incoming side, collimator section 502, optical deflection element section 503 on the incoming side, common optical waveguide 504, optical deflection element section 505 on the outgoing side, light condensing section 506 and optical waveguide section 507 on the outgoing side. Note that the optical waveguide section 501 on the incoming side, collimator section 502, optical deflection element section 503 on the incoming side, common optical waveguide section 504, optical deflection element section 505 on the outgoing side, light condensing section 506 and optical waveguide section 507 on the outgoing side are integrally formed on a substrate.

In this case, the optical waveguide section 501 on the incoming side is configured to include a plurality of optical waveguides (cores) 501a serving as an input port and a cladding layer 501b that surrounds these optical waveguides 501a and provides confinement of light within the optical waveguide 501a by using a difference in refractive index. Likewise, the optical waveguide section 507 on the outgoing side is also configured to include a plurality of optical waveguides (cores) 507a serving as an output port and a cladding layer 507b that surrounds these optical waveguides 507a and provides confinement of propagating light within the optical waveguide 507a by using a difference in refractive index.

It should be noted that the number of the optical waveguides (input ports) 501a of the optical waveguide section 501 on the incoming side and the number of the optical waveguides (output ports) 507a of the optical waveguide section 507 on the outgoing side are the same (n). That is, in this case, the optical switch module is an n×n array of optical switches. Note that needless to say, the number of the optical waveguides 501a and the number of the optical waveguides 507a may be different.

The collimator section 502 is for individually collimating light within each of a plurality of light signals incoming from the respective optical waveguides 501a of the optical waveguide section 501 on the incoming side and therefore is configured to include a number n of collimator lenses 502a. Individual collimator lenses 502a are disposed at a position apart slightly from the edges of the optical waveguides 501a, respectively. This allows light emitted from the optical waveguide 501a to be collimated by the collimator lens 502a even though the light emitted therefrom spreads in a radial pattern.

The optical deflection element section 503 on the incoming side is for individually switching the direction of each of propagating light signals, which have passed through the collimator section 502, using an electro-optic effect (Pockels effect) and a number n of optical deflection elements 503a each are disposed at a position apart slightly from the collimator lenses 502a along an optical axis. The individual optical deflection elements 503a each are comprised of a single prism pair or a plurality of prism pairs and the prism pair is formed by a method including: providing an optical waveguide (slab waveguide) 402 formed of a material exhibiting an electro-optic effect, such as PLZT ((Pb, La)(Zr, Ti)O$_3$); forming an electrode in the shape of a wedge (e.g. triangle shape); disposing the electrodes as the aforementioned first and second upper electrodes 403 (403a, 403b) on a light signal region of the slab waveguide 402, so that the distal ends of the wedges are pointing opposite directions; and disposing the electrodes as the aforementioned first and second lower electrodes 401 (401a, 401b) below the corresponding upper electrodes.

The common optical waveguide section 504 allows light passing through the optical deflection element section 503 on the incoming side to propagate into the optical deflection element section 505 on the outgoing side. Although a plurality of light signals simultaneously pass through the common optical waveguide section 504, these light signals travel straight in previously established directions within the common optical waveguide section 504 and therefore travel without interfering with other light signals. Further, an example of an optical path between the optical deflection element section 503a on the incoming side and the optical deflection element section 505a on the outgoing side is schematically shown in FIG. 9.

The optical deflection element section 505 on the outgoing side is for individually switching the direction of each of the propagating light signals after their passage through the common optical waveguide section 504, using an electro-optic effect and similarly to the optical deflection element section 503 on the incoming side, a number n of optical deflection elements 505a are provided. These optical deflection elements 505a each have the same or similar configuration as the optical deflection elements 503a and deflect light, which has reached the optical deflection element 505a through the common optical waveguide section 504, in the direction parallel to the optical waveguide 507a.

The light condensing section 506 is comprised of a number n of light condensing lenses 506a and these light condensing lenses 506a condense light that has passed through the optical deflection elements 505a, causing light to be guided into the optical waveguides 507a.

According to such optical switch module, the optical deflection element sections 503 and 505 are each operable to change the propagation direction of light between the first upper electrode 403a and the first lower electrode 401a, and further to change the propagation direction of light between the second upper electrode 403b and the second lower electrode 401b, and therefore, there will be the benefit of being able to significantly change the propagation direction of light.

Additionally, since the first and second upper electrodes 403a, 403b are disposed so that the distal ends of the corresponding wedges are pointing opposite directions and the first upper electrode 403a is disposed to face the first lower electrode 401a, and the second upper electrode 403b is disposed to face the second lower electrode 401b, it can also be concluded that this approach has the benefit of providing greater geometric density of electrodes. Note that other behavior and effects of this optical switch are described in detail in Patent Document 2 and therefore explanation thereof is omitted.

However, in the optical switch module having the configuration described in this Patent Document 2, a variety of variation factors such as temperature dependence and drift over time of an electro-optic constant, and temperature dependence of optical coupling system, etc., sometimes prevent the module from providing sufficient optical coupling efficiency, even when an optimal voltage (to be applied between the electrodes 401 and 403) for providing maximum optical coupling efficiency has been pre-configured as an initial setting according to analysis of optical switch module after its fabrication.

For example, in the optical switch module described in the Patent Document 2, when the collimator section 502 on the incoming side is displaced by 50 μm in the direction orthogonal to the direction of incoming light, optical coupling efficiency is reduced by 5 dB. Further, when atmospheric temperature changes, it is expected that a difference between thermal expansion coefficients of the collimator section 502 and the common optical waveguide section 504 causes displacement of the above optical system. Moreover, in the optical deflection elements 503a, 505a formed of a material exhibiting an electro-optic effect as is the case with the optical switch module of this Patent Document 2, deflection angle versus applied voltage characteristics potentially changes with the lapse of time or due to temperature changes.

The foregoing description indicates that the optical switch module disclosed in Patent Document 2 needs a method for monitoring optical output power and using feedback control so that variations in the optical output power are prevented. Subsequently, for explanation of the conventional examples, an angle at which an optical beam is deflected by the wedge-shaped electrode will be discussed. When wedge-shaped electrodes are disposed facing each other on the upper and lower side of the slab waveguide that exhibits an electro-optic effect and has a thickness of d, and a voltage V applied between the upper and lower electrodes, a refractive index change Δn due to the first order electro-optic effect (Pockels effect) is given by the following equation (1):

$$\Delta n = -\frac{1}{2} r \cdot n^3 \cdot \frac{V}{d} \quad (1)$$

where r is an electro-optic constant (Pockels constant: TE mode) in the direction of electric field, n is a refractive index for abnormal light. Further, as shown in FIG. 10A, when assuming that an incident angle to the wedge-shaped electrode is θin, a deflection angle of light at the input plane is α, an outgoing angle of light is θout, and paraxial ray approximation is valid for all of θin, α and θout, the relationship given by the following equation (2) is established between θin and θout:

$$\theta_{out} \cong \theta_{in} - \frac{L}{W} \cdot \frac{\Delta n}{n} \quad (2)$$

Moreover, in the case of a prism pair (see FIG. 10B), the corresponding relationship is given by the following equation (3):

$$\theta_{out} \cong \theta_{in} - 2 \cdot \frac{L}{W} \cdot \frac{\Delta n}{n} \quad (3)$$

Subsequently, a Gaussian beam model is applied to the optical system shown in FIG. 8 and optical coupling efficiency between input and output fiber optics is computed. As shown in FIG. 11, it is assumed that an optical reference plane 700 is the midpoint between input and output; lateral direction, longitudinal direction, and direction vertical to the paper are z-, x- and y-axes, respectively; and a deflection angle is so small that paraxial ray approximation is valid. Moreover, input and output are symmetric relative to the reference plane 700 and the spot sizes of incoming light and outgoing light are the same, and distances from the reference plane 700 to beam waists are equal. In this case, the optical coupling efficiency η of a Gaussian beam is represented by the following equations (4) and (5):

$$\eta = k_x \exp\left[-k_x^2 \left\{ \frac{\Delta x^2}{w^2} + \frac{\pi^2 \Delta \theta^2 w^2}{\lambda^2}\left(1+\left(\frac{\lambda z}{\pi w^2}\right)^2\right) - \Delta x \Delta \theta \frac{2z}{w^2} \right\}\right] \quad (4)$$

$$k_x = \left\{1+\left(\frac{\lambda z}{\pi w^2}\right)^2\right\}^{-\frac{1}{2}} \quad (5)$$

In the above equations, λ is a wavelength, w is a beam waist width, z is a distance from the reference plane 700 to the beam waist. Further, Δx is a displacement between propagating light and a nominal optical axis in the reference plane 700, and likewise, Δθ is an angular displacement of the propagating light from the nominal optical axis.

Given that a voltage applied to the prism pair 503a on the incoming side is Vin and a voltage applied to the prism pair 506a on the outgoing side is Vout, it is ideal that when an optical path from a certain input channel m to a certain output channel n is established, the relationship Vin=Vout results. That is, a beam exiting the collimator section 502 and deflected by the prism pair 503a on the incoming side is deflected by the prism pair 505a on the outgoing side at an angle parallel to the beam exiting the collimator section 502, and enters the light condensing section 506. Here, it is assumed that the values of Vin and Vout are an initial value (path information) upon establishment of the path. The path information can be given by referring to a memory.

As described above, although it is expected that variation factors such as temperature changes and drift over time act to displace the above initial values from values corresponding to the optimal optical coupling, the module comes into a state in which optical power can be sufficiently detected (monitored). Under such state, it becomes possible that feedback control is applied to Vin, Vout. Control allowing optical coupling efficiency to be maximum (i.e., optimal coupling control) is performed so that Vin or Vout is finely adjusted so as to have a value which causes the optical power detected to be maximized using the feedback control.

It should be noted that when optical coupling efficiency versus applied voltages Vin, Vout is calculated, a distribution such as that shown in FIG. 12A can be obtained. FIG. 12B is a diagram illustrating a contour map for the distribution of optical coupling efficiency shown in FIG. 12A. Note that in FIGS. 12A and 12B, the optical coupling efficiency is normalized and the contour map shows an inclined elliptical distribution in (Vin, Vout) coordinate system.

In a control system having such a distribution of optical coupling efficiency, a conventional control scheme has been implemented so that feedback control is performed by alternately and finely adjusting Vin and Vout. That is, the conventional control scheme is to control the contour map along Vin axis and Vout axis. According to this scheme, an identification failure zone will be produced so as to correspond to a region in which search is performed in a direction to a peak point. An example of the identification failure zone is shown in FIG. 13.

First, a process of how a point of interest reaches a peak point (point P) from a point X in FIG. 13 will be analyzed below. At the beginning, feedback control is selected along a cross section taken along a line A–A' parallel to Vin axis and optical output power (optical coupling efficiency) after application of a unit step of ΔVin is compared to the power just before the application of the unit step, and Vin is changed so that the power increases. When the power exceeds the peak X' after application of a few steps of ΔVin, the control performed parallel to Vin axis is temporarily terminated and transferred to a control performed parallel to Vout axis.

Likewise, the control performed parallel to Vout axis is performed in a unit step of ΔVout and terminated when the power exceeds the peak Y in the plane of a cross section taken along a line B–B'. Such operation is repeated to find the peak point P. The peak point P is determined so that the power necessarily decreases whenever the point of interest moves toward a positive (+) or negative (−) direction of Vin and Vout axes, and after determination of the peak point P, the search is completed.

The aforementioned feedback control algorithm will be explained with reference to FIG. 14. First, input/output channel information is retrieved from a memory (step A1); prism pairs 503a, 505a to be controlled are selected and applied voltages Vin, Vout (initial values) to the selected prism pairs 503a, 505a are determined (step A2); and the determined voltages are applied to the prism pairs 503a, 505a (step A3).

Then, the optical output power is monitored and a received power level is detected (detection of outputs from an A/D converter, etc.) (step A4); and whether or not an abnormality including, for example, the fact that the optical output power cannot be detected occurs is determined (step A5). When the abnormality has occurred (in case of NO at step A5), the process beginning with the above step A1 is again implemented. That is, it can be concluded that the aforementioned process is feedforward control which is performed to determine, based on the input/output channel information, initial voltages to be applied to the prism pairs 503a, 505a to be controlled.

On the other hand, when no abnormality has been detected in the monitored optical output power (in case of YES at step A5), the process is transferred to subsequent feedback control. That is, first, an applied voltage Vin to the prism pair 503a on the incoming side is increased by a voltage of ΔVin (step A6) and a received power level (A/D value) is detected (step A7). When the A/D value increases (in case of YES at step A8), the process determines that the current search direction is correct and Vin is increased by a voltage of ΔVin (step A9). In contrast to it, when the A/D value decreases (in case of NO at step A8), the process determines that the current search direction is incorrect and Vin is decreased by a voltage of ΔVin (step A12).

After that, a number of repetitions of Vin increase is performed (YES route at step A10 or step A14, and at step A11 or A14) until the A/D value begins to decrease (until NO is determined in step A11 or step A14) and when the A/D value has decreased, the control along Vin axis is stopped and the process is transferred to control along Vout axis (control of an applied voltage to the prism pair 505a on the outgoing side) (step A15).

The control along Vout axis is also implemented in a manner similar to the control along Vin axis (step A16 to step A24) and again, the process is transferred to the control along Vin axis (step A25). After a predetermined number (N) of repetitions of the above loop (NO route at step A26), the search to find the peak point is completed (YES route at step A26).

However, although a shortest course to be detected by the control is a path denoted by the numeral 602 in FIG. 13 according to the aforementioned control scheme, in the case of a start point X being located within the identification failure zone 600, the direction of starting the search is just opposite to that of starting the search to find the shortest course 602 (refer to a path 601). Consequently, the search will be performed taking a lengthy detour to reach the peak point P until the search is converged and therefore it takes a long time to implement the feedback control, significantly delaying the switching of optical paths in the optical switch module.

SUMMARY OF THE INVENTION

The present invention is conceived in consideration of the aforementioned problems and directed to an approach to reducing the time necessary for control of switching in an optical switch employed in an optical signal switching apparatus, in order to allow the optical switch to operate at high speed.

In order to achieve the above object, an optical signal switching apparatus according to the present invention is characterized in that the apparatus includes: an optical switch which includes incoming light deflection means to deflect incoming light from a predetermined input port in an arbitrary direction, and outgoing light deflection means to deflect outgoing light from the incoming light deflection means in an arbitrary direction and couple the light signal to a predetermined output port; monitoring means to monitor optical coupling efficiency of the light signal into the output port; and control means for controlling in a parallel fashion deflection characteristics of the deflection means and deflection characteristics of the incoming light deflection means, so that the optical coupling efficiency monitored by the monitoring means is maximized.

Further, an optical switch controller according to the present invention is for control of an optical switch, which includes incoming light deflection means to deflect an incoming light signal from a predetermined input port in an arbitrary direction, and outgoing light deflection means to deflect an outgoing light signal from the light deflection means in an arbitrary direction, and couple the light signal to a predetermined output port, and is characterized in that the controller includes: monitoring means for monitoring optical coupling efficiency of the light signal into the output port; and control means for controlling in a parallel fashion deflection characteristics of the incoming light deflection means and deflection characteristics of the outgoing light deflection means, so that the optical coupling efficiency monitored by the monitoring means is maximized.

Moreover, an optical switch control method according to the present invention is for control of an optical switch, which includes incoming light deflection means to deflect incoming light from a predetermined input port in an arbitrary direction, and outgoing light deflection means to deflect outgoing light from the incoming light deflection means in an arbitrary direction, and couple the light signal to a predetermined output port, and is characterized in that the method includes: monitoring optical coupling efficiency of the light signal into the output port; and controlling deflection characteristics of the incoming light deflection means and deflection characteristics of the outgoing light deflection means in a parallel fashion so that the monitored optical coupling efficiency is maximized.

DETAILED DESCRIPTION OF THE PREFERRED EMBODIMENTS (A) Explanation of one embodiment.

Figure 1:
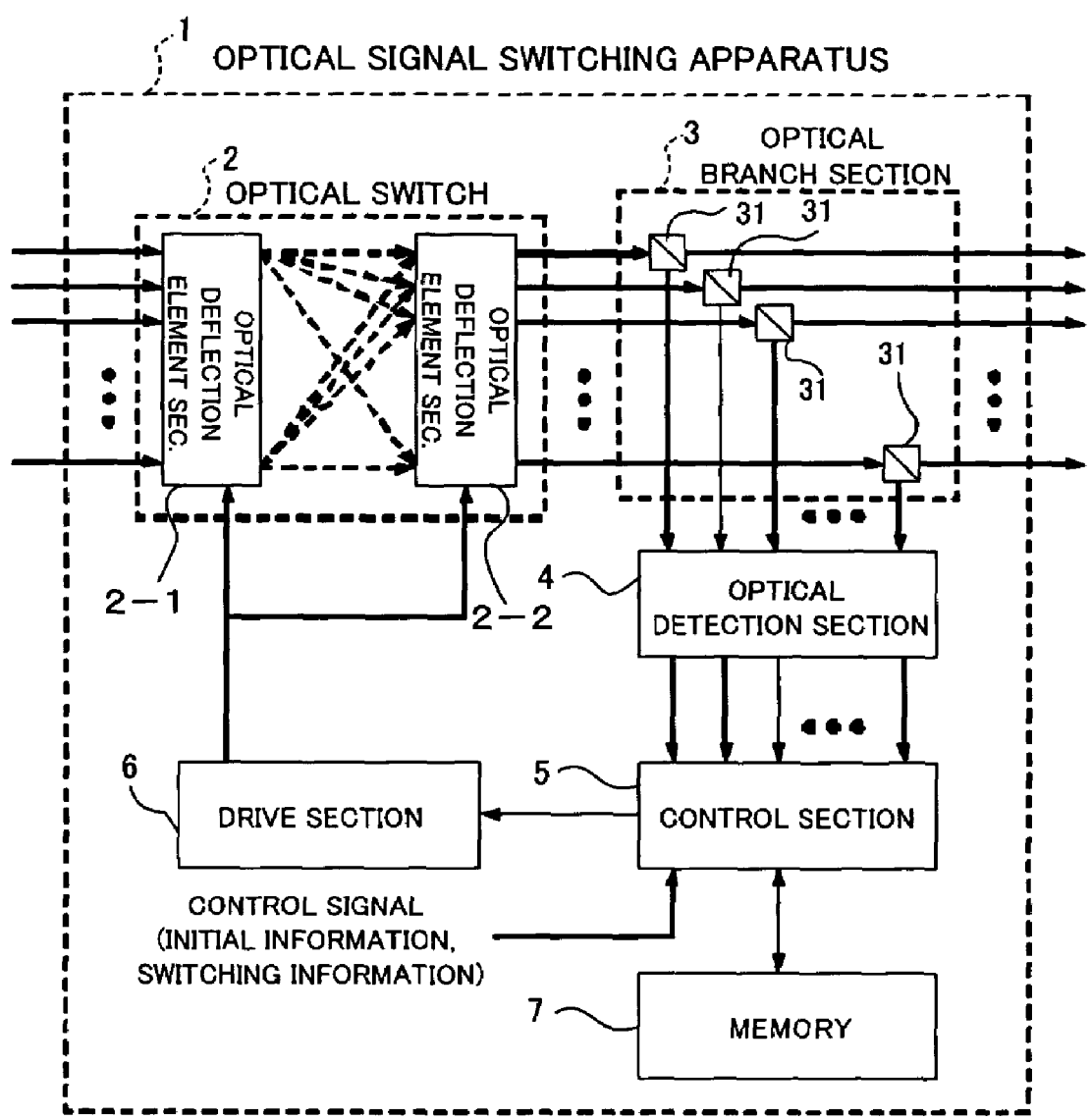
FIG. 1 is a block diagram illustrating the configuration of an optical node (optical signal switching apparatus) of the invention.
Figure 5:
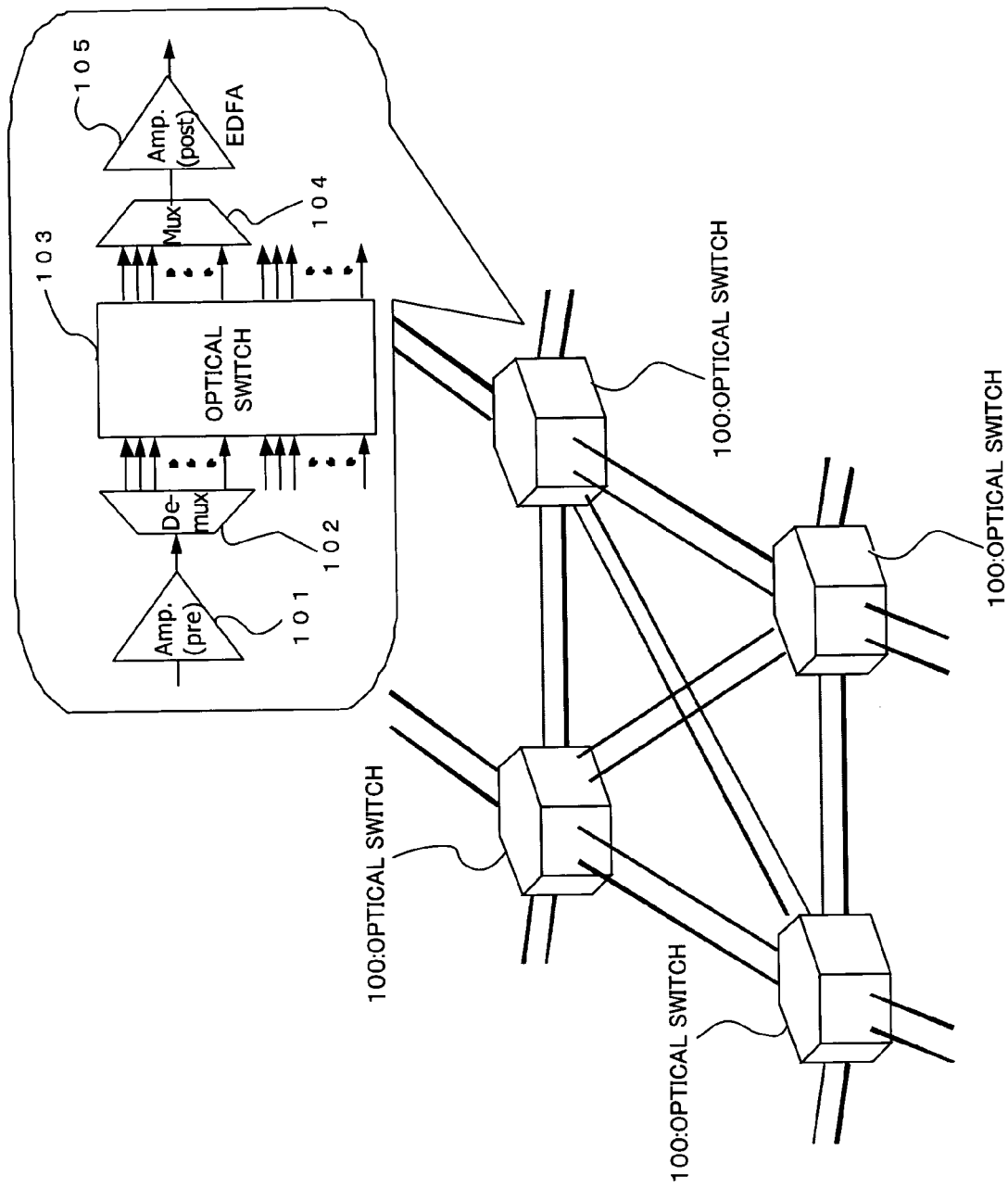
FIG. 5 is a block diagram illustrating an example of a conventional OXC system.
Figure 6:
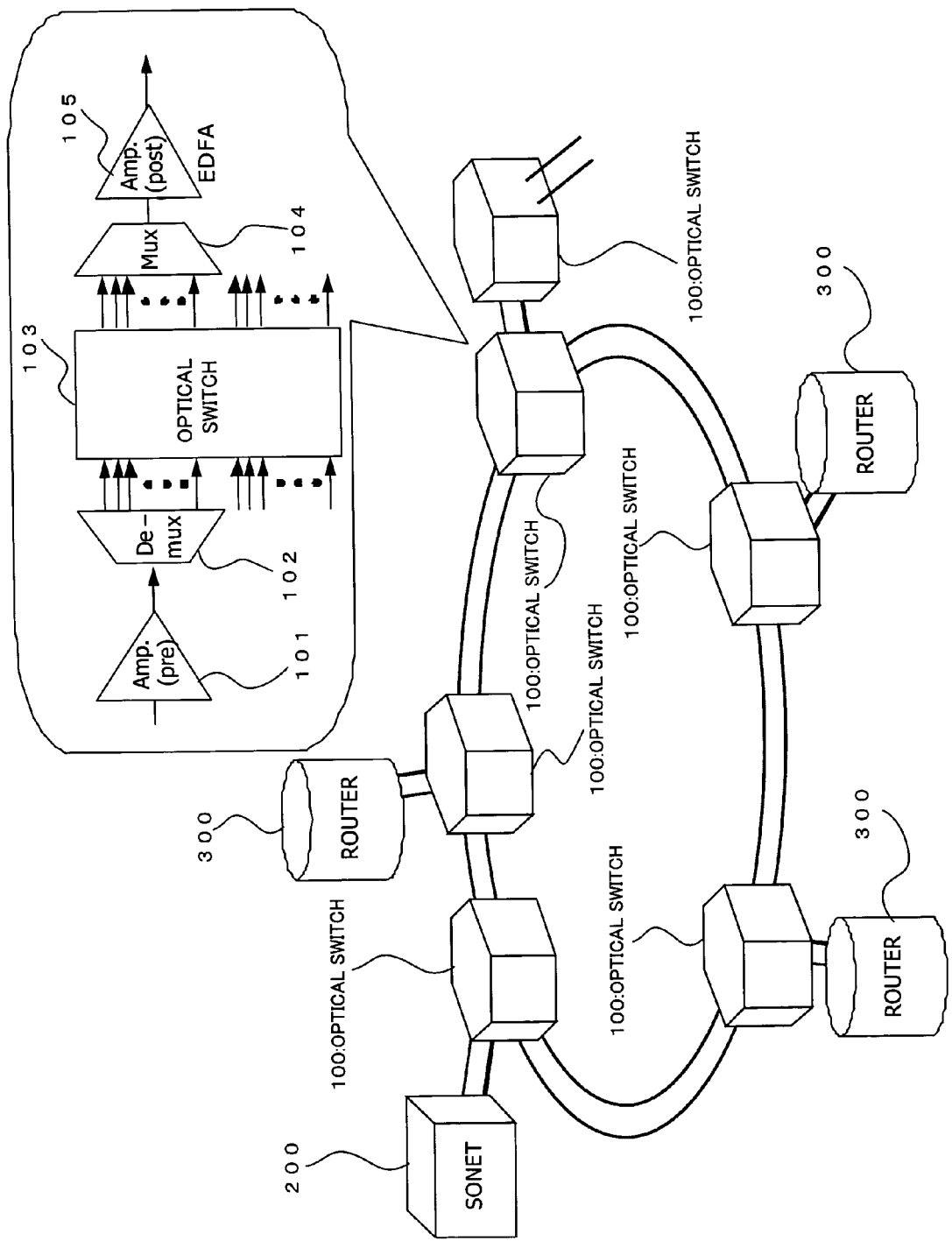
FIG. 6 is a block diagram illustrating an example of a conventional OXC system (optical add/drop ring system)
Figure 7A:
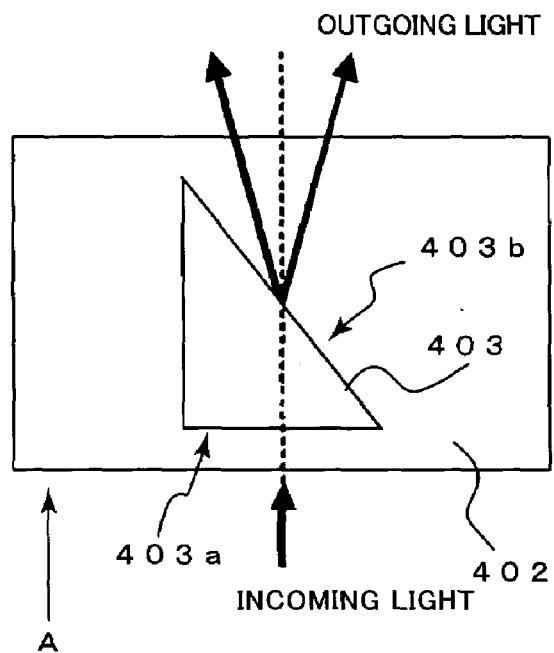
FIG. 7A is a schematic plan view illustrating a conventional optical deflection element.
Figure 7B:
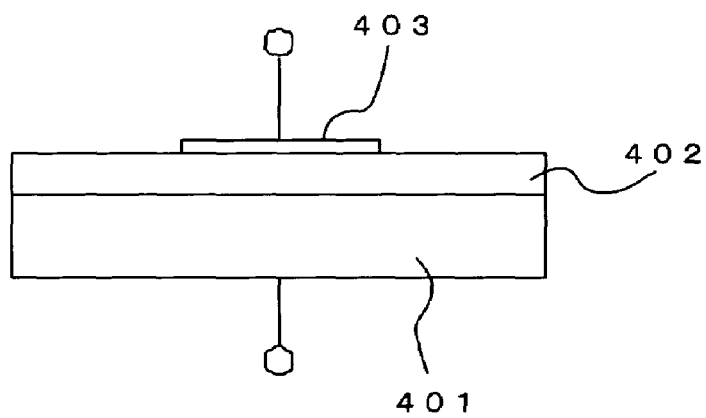
FIG. 7B is a view in a direction of an arrow 'A' in FIG. 7A.

FIG. 1 is a block diagram illustrating the configuration of an optical node (optical signal switching apparatus) according to the invention and an optical node 1 shown in FIG. 1 is also applied to the aforementioned OXC system of FIG. 5 or FIG. 6, and in this case, configured to include, for example, an optical switch 2, optical branch section 3, optical detection section 4, control section 5, drive section 6, memory 7 and the like.

It should be noted that the optical switch 2 is configured, for example, as an optical switch module that has the configuration similar to that previously described in connection with FIG. 8 and uses an electro-optic effect, and is configured to include an optical deflection element section 2-1 on the incoming side (incoming light deflection means) and an optical deflection element section 2-2 on the outgoing side (outgoing light deflection means). These optical deflection element sections 2-1 and 2-2 each have the configuration similar to those of the aforementioned optical deflection element sections 503, 505 described in connection with FIG. 8 and the optical deflection element section 2-1 on the incoming side deflects a light signal input from a predetermined input port (optical waveguide) 501*a* in an arbitrary direction, and the optical deflection element section 2-2 on the outgoing side deflects the light signal from the optical deflection element section 2-1 on the incoming side in an arbitrary direction, in order to couple the signal to a predetermined output port (optical waveguide) 507*a*.

Accordingly, the optical deflection element sections 2-1 and 2-2 each have provided therein a specific number of optical deflection elements (not shown) corresponding, for example, to the number n of input wavelengths (the number of optical channels) and also in this case, voltages (Vin, Vout) applied between an upper electrode and lower electrode of the optical deflection element are made variable to allow optical paths switching between the optical deflection element sections 503 and 505.

The optical branch section 3 individually branches the respective light signals (channel signals) emitted from the optical switch 2 (optical deflection element section 2-2) and outputs the branched signals as monitoring light for an optical output power to the optical detection section 4, and therefore, for example, has optical branching couplers 31 provided for the individual channels.

The optical detection section (monitoring means) 4 receives the monitoring light branched by the respective optical branching couplers 31 and converts the light to an electrical signal in proportion to the amount of the received light, in order to detect (monitor) the optical output power of the optical switch 2 (i.e., the optical coupling efficiency to the output port 507*a*) for each of the channels. Note that also in this case, the aforementioned optical output power (received power level) is obtained, for example, as an A/D value after A/D conversion of the aforementioned electrical signal.

The drive section 6 applies voltages Vin, Vout to the optical deflection sections 2-1, 2-2 in accordance with instructions from the control section 5 in order to individually control the deflection characteristics of the deflection sections. The memory 7 stores information necessary for the control section 5 to perform feedback control and is implemented, for example, by RAM, etc.

Figure 8:
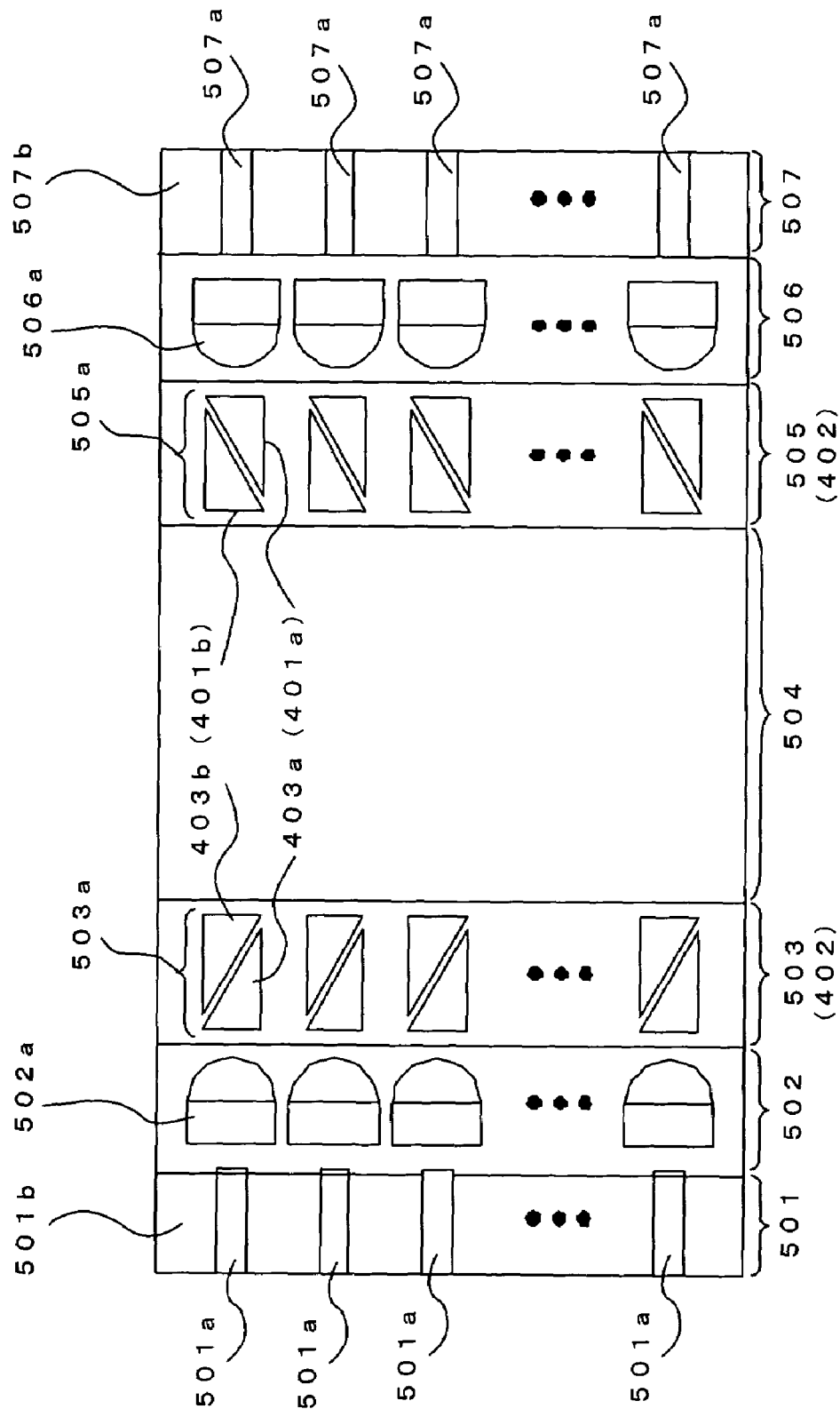
FIG. 8 is a plan view illustrating the configuration of a conventional optical switch module using an electro-optic effect.
Figure 9:
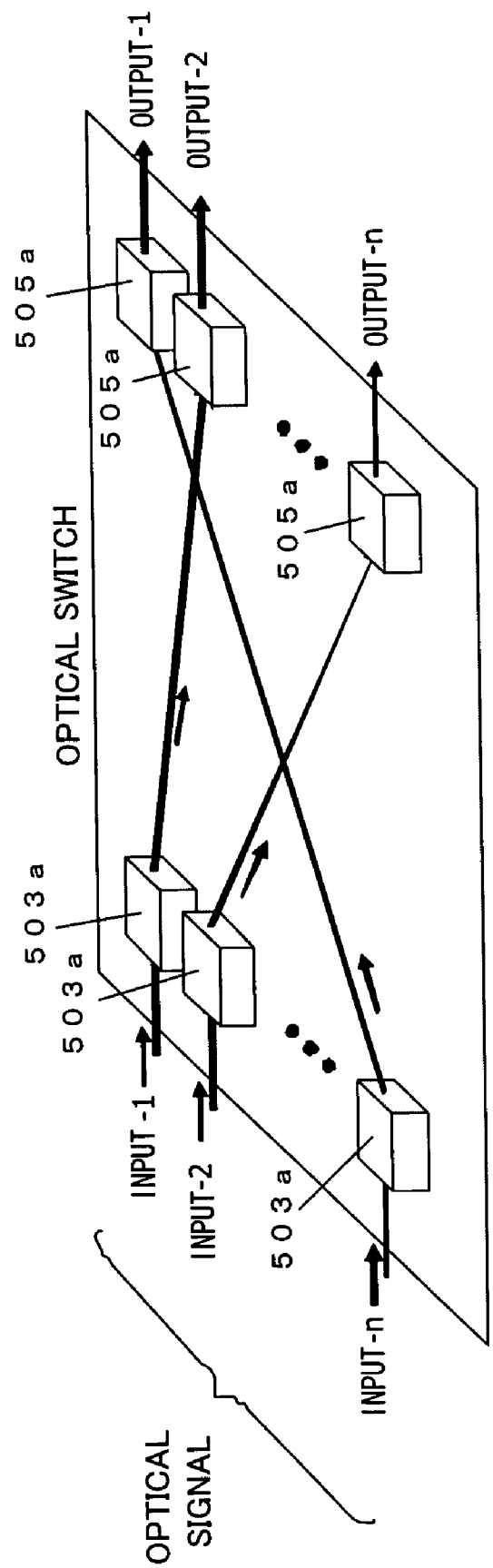
FIG. 9 is a diagram illustrating optical paths in the conventional optical switch module.
Figure 10A:
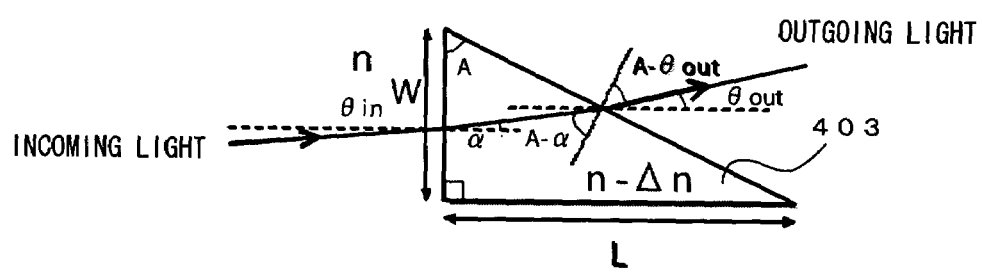
FIGS. 10A and 10B are a diagram to explain how an optical path changes due to change observed in a refractive index of the conventional optical deflection element and caused by an electro-optic effect (Pockels effect)
Figure 10B:
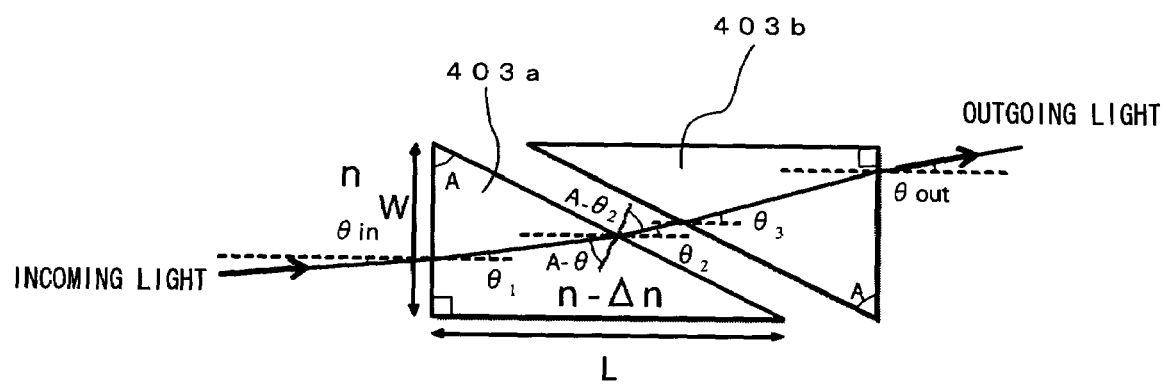

The control section 5 instructs the drive section 6 to apply the voltages Vin, Vout to the respective optical deflection sections 2-1, 2-2 based on the received power level on each of the channels, which level is obtained by the aforementioned optical detection section 4, so that the received power level on the corresponding channel becomes maximum (i.e., the coupling efficiency of an light signal to the output port 507a shown in FIG. 8 becomes maximum), meaning that the deflection characteristics of the optical deflection sections 2-1, 2-2 are feedback-controlled. The control section 5 is implemented, for example, by CPU, etc.

It should be noted that also in this case, feedforward control is performed so that the initial values of Vin, Vout are set, for example, such that a channel to be controlled is selected based on initial information (input/output channel information, initial voltage information, etc.), switching information (optical path switching information), etc., input from the outside, in order to determine applied voltages Vin, Vout based on the aforementioned initial voltage information.

Additionally, when the feedback control is performed, the control section 5 performs control of the applied voltage Vin to the optical deflection section 2-1 on the incoming side and control of the applied voltage Vout to the optical deflection section 2-2 on the outgoing side in a parallel fashion, instead of a sequential one, and in more detail, controls Vin and Vout simultaneously.

Figure 2:
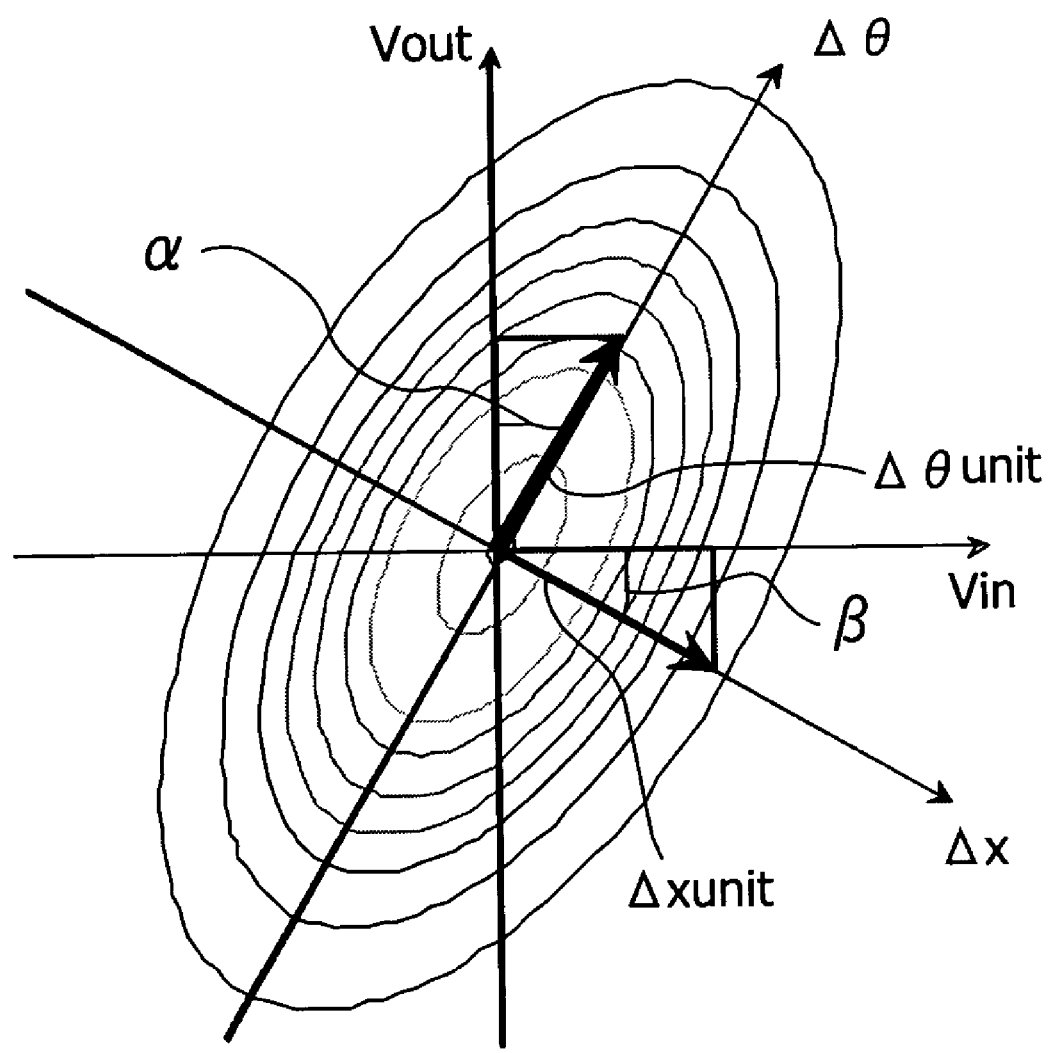
FIG. 2 is a diagram illustrating an example of a contour map of optical coupling efficiency according to this embodiment.
Figure 12A:
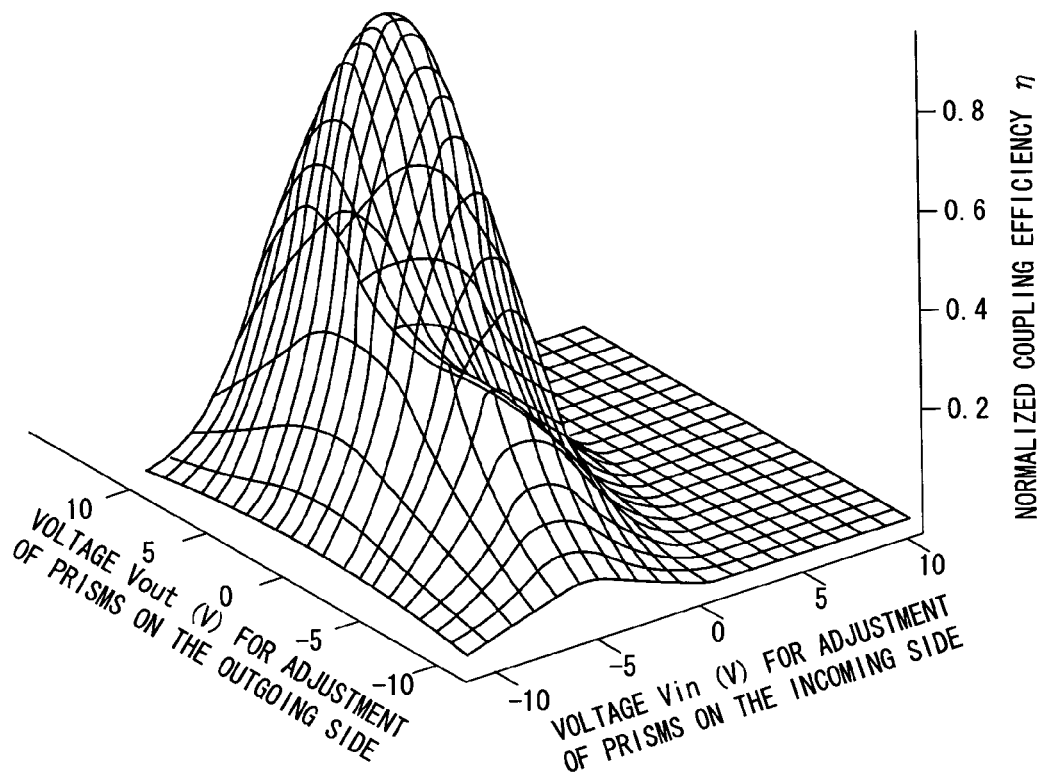
FIG. 12A is a diagram illustrating an example of distribution indicating how optical coupling efficiency varies with applied voltages to input/output prism pairs shown in FIG. 8.
Figure 12B:
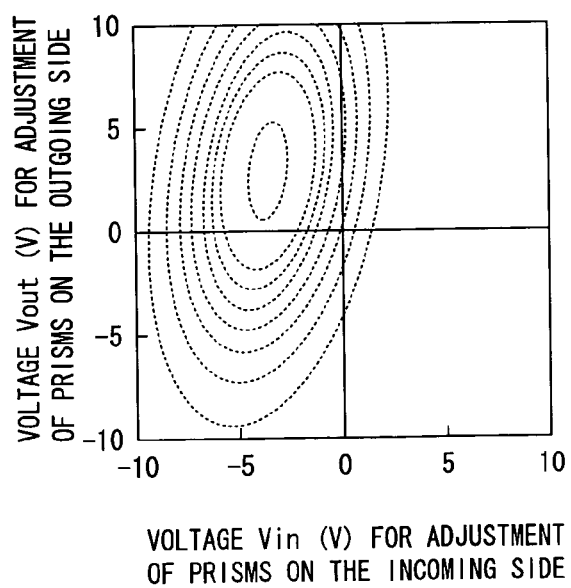
FIG. 12B is a diagram illustrating a contour map for the distribution shown in FIG. 12A.
Figure 13:
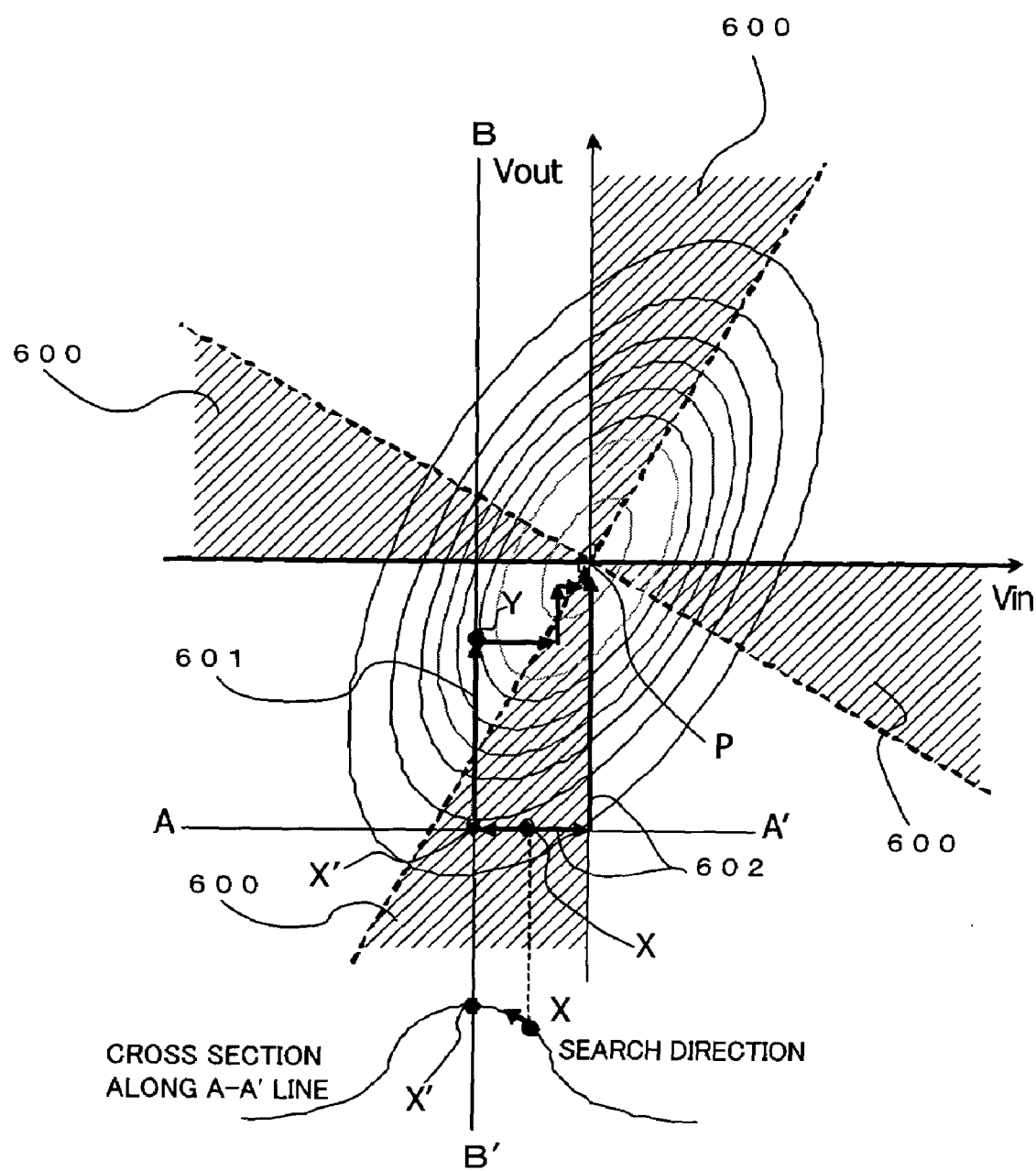
FIG. 13 is a diagram illustrating a contour map for distribution of optical coupling efficiency for explanation of how an optical switch is controlled according to a conventional method.
Figure 14:
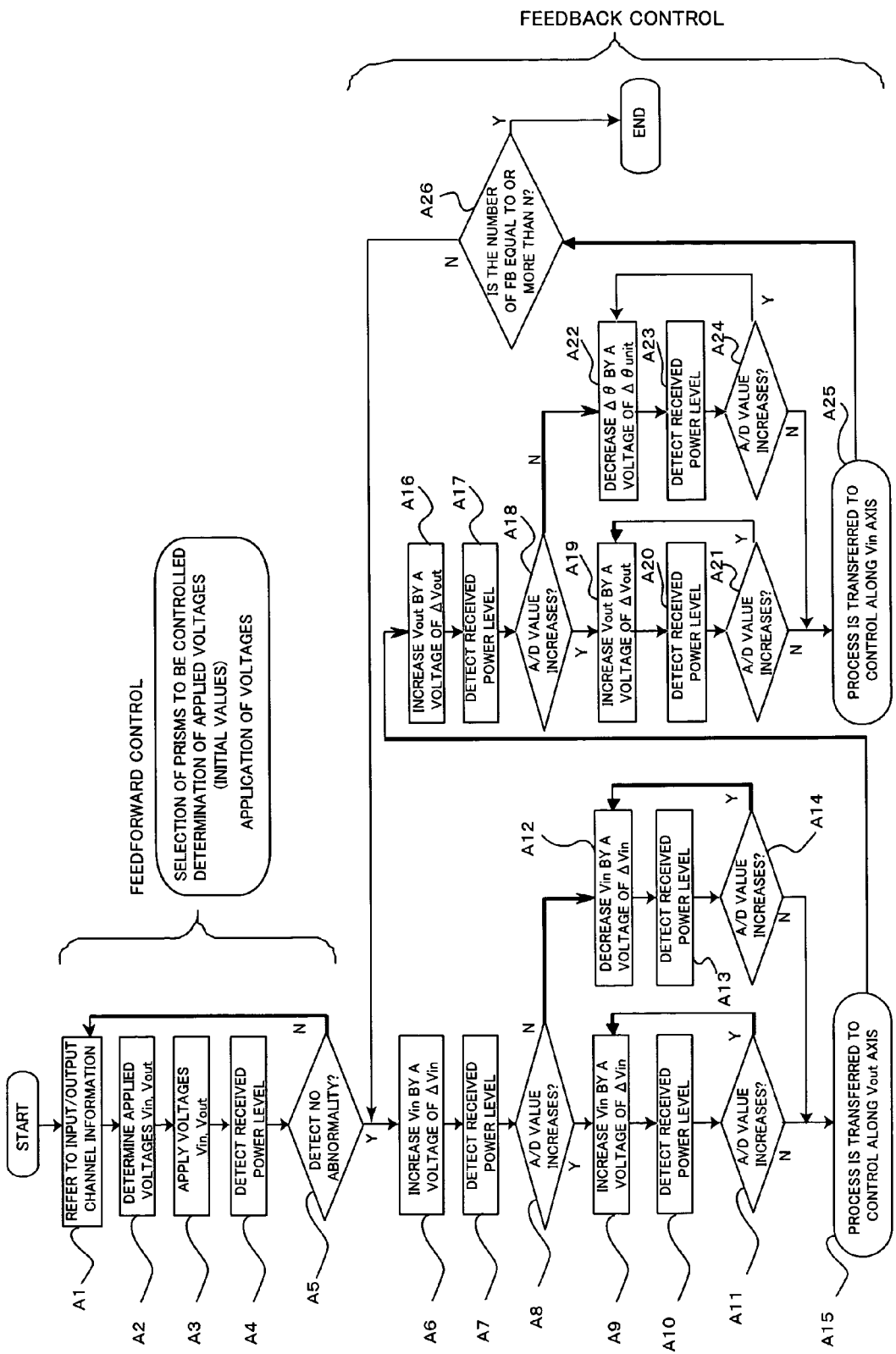
FIG. 14 is a flow chart to explain how the optical switch is controlled according to the conventional method.

That is, in this embodiment, we focus our attention on an ellipse (meaning that a relationship between controlled variables corresponding to the respective optical deflection sections 2-1, 2-2 and allowing those sections to exhibit the same optical coupling efficiency is represented by the shape of an ellipse) that is oriented obliquely on a contour map (hereinafter, referred to also as a voltage map or optical coupling efficiency map) for the distribution of optical coupling efficiency shown in FIG. 12B and FIG. 13 in the (Vin, Vout) coordinate system, and try to convert control axes from Vin and Vout coordinate axes to axes parallel to the major diameter and minor diameter of the ellipse. In more detail, for example, as shown in FIG. 2, feedback control voltages Vin, Vout applied to the respective optical deflection sections 2-1, 2-2 upon actual control are represented by the following equations (6), (7), provided that an unit step amounts for $\Delta\theta$, $\Delta x$ are given by $\Delta\theta$unit, $\Delta x$unit, respectively:

Applied voltage upon control along $\Delta\theta$ axis $\Delta \text{Vin} = \Delta\theta \text{unit} \sin \alpha$ $\Delta \text{Vout} = \Delta\theta \text{unit} \cos \alpha$ (6)

Applied voltage upon control along $\Delta x$ axis $\Delta \text{Vin} = \Delta x \text{unit} \cos \beta$ $\Delta \text{Vout} = -\Delta x \text{unit} \sin \beta$ (7)

Note that although in the above equations, $\alpha$ and $\beta$ are given respectively, $\Delta\theta$ axis and $\Delta x$ axis are actually orthogonal to each other and therefore an assumption of $\alpha = \beta$ is allowed. Hereinafter, explanation will be made using an assumption of $\alpha = \beta$. Moreover, a relationship represented by the following equation (8) is applied to $\Delta\theta$unit and $\Delta x$unit. Note that in the equation (8), A represents a major diameter of the ellipse and B represents a minor diameter of the ellipse.

$$\frac{\Delta\theta unit}{\Delta x unit} = \frac{A}{B}$$ (8)

That is, the control section 5 of this embodiment serves as a control axis conversion section 51 for converting the respective control axes corresponding to the individual optical deflection sections 2-1, 2-2 and represented by information (control map information) about the contour map in the (Vin, Vout) coordinate system to the control axes ($\Delta x$ axis and $\Delta\theta$ axis) different from the corresponding deflection control axes and parallel to the major diameter and minor diameter of the ellipse by using mathematical computation according to the equation (8).

Consequently, voltage control on the individual optical deflection sections 2-1, 2-2 will be performed in directions along major diameter axis ($\Delta\theta$ axis) and minor diameter axis ($\Delta x$ axis) of the ellipse shown in FIG. 2, instead of along Vin axis and Vout axis as in the conventional case. Such a voltage control eliminates the aforementioned identification failure zone 600 of FIG. 13 where incorrect search to find the peak point P of the optical coupling efficiency occurs and allows convergence time taken to find the peak point P to be significantly reduced compared to that in the conventional techniques.

It should be noted that the aforementioned contour map information is previously obtained as theoretical values or measurement values for the respective channels (optical paths between the optical deflection sections 2-1 and 2-2) and stored as data, etc., in a table form in the memory 7. Further, data ($\alpha$, $\beta$, A, B, etc.) necessary for the above computation equation (8) is also and previously stored in the memory 7. Note that it is also possible that those information are not stored in the memory 7 and instead, values determined by the above computation equation (8) are previously stored as data in a table form in the memory 7.

That is, a block comprised of the aforementioned control section 5, drive section 6 and memory 7 serves as control means (controller for the optical switch 2) for controlling deflection characteristics of the respective optical deflection sections 2-1 and 2-2 in a parallel fashion so that the optical coupling efficiency to be monitored by the optical detection section 4 becomes maximum.

Figure 3:
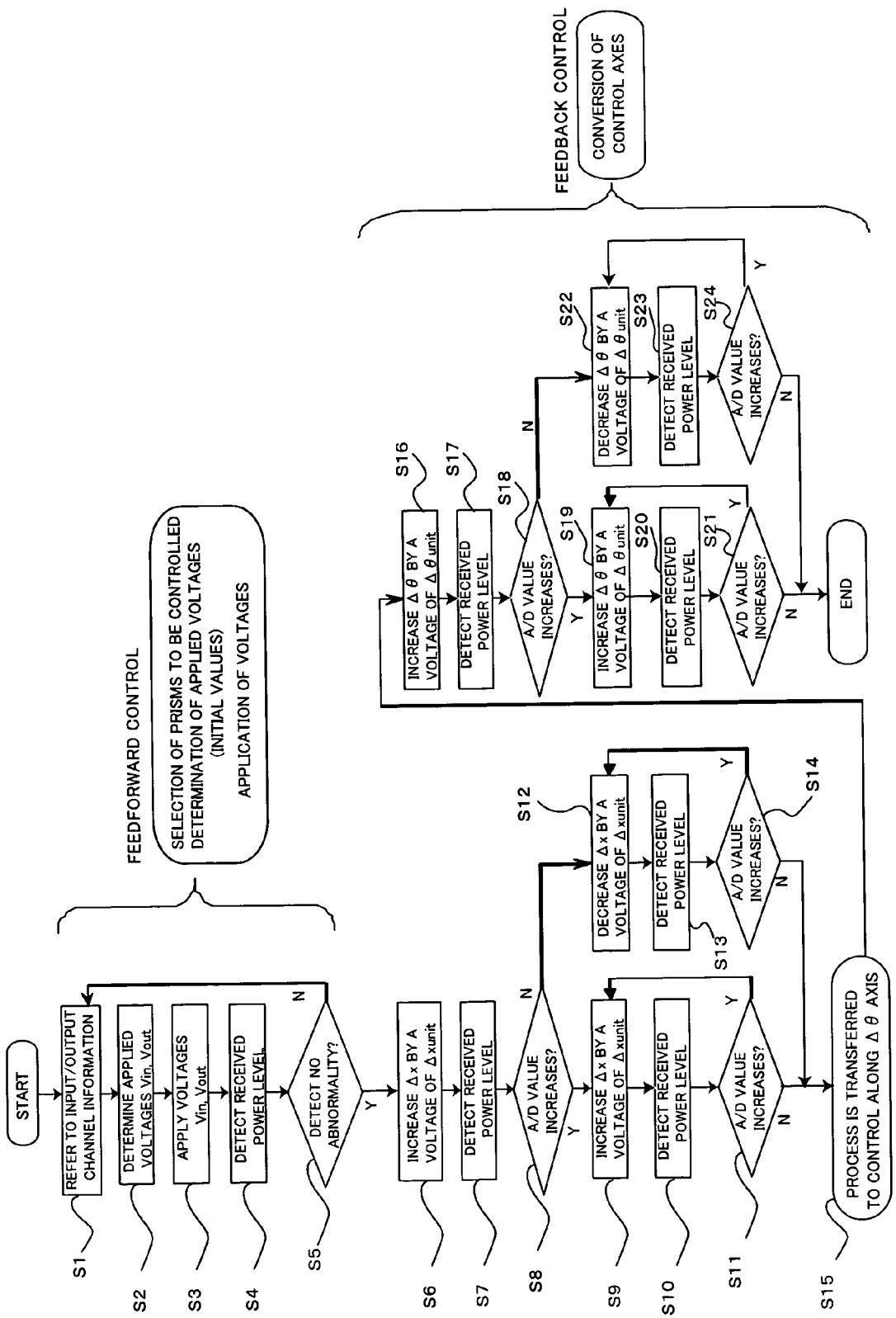
FIG. 3 is a flow chart to explain a method for control of the optical switch of this embodiment.

Hereinafter, how the control section 5 constructed as described above in accordance with this embodiment controls the optical switch 2 will be explained in detail with reference to a flow chart (steps S1 to S24) shown in FIG. 3 and a voltage map shown in FIG. 4.

First, the control section 5 accesses the memory 7 and refers to input/output channel information (step S1); selects a channel to be controlled and determines initial values of Vin, Vout for the selected channel to be controlled (step S2); and instructs the drive section 6 to apply the voltages having the determined values to the prism pairs 503a, 505a corresponding to the channel to be controlled, of the optical deflection sections 2-1 and 2-2 (step S3).

Then, optical output power is monitored and a received power level is detected (e.g., a value of output of an A/D converter within the optical detection section 4 is detected) (step S4); whether or not an abnormality including, for example, the fact that the optical output power cannot be detected occurs is determined (step S5); and when the abnormality has occurred (in case of NO at step S5), the process beginning with the above step S1 is again implemented.

Figure 4:
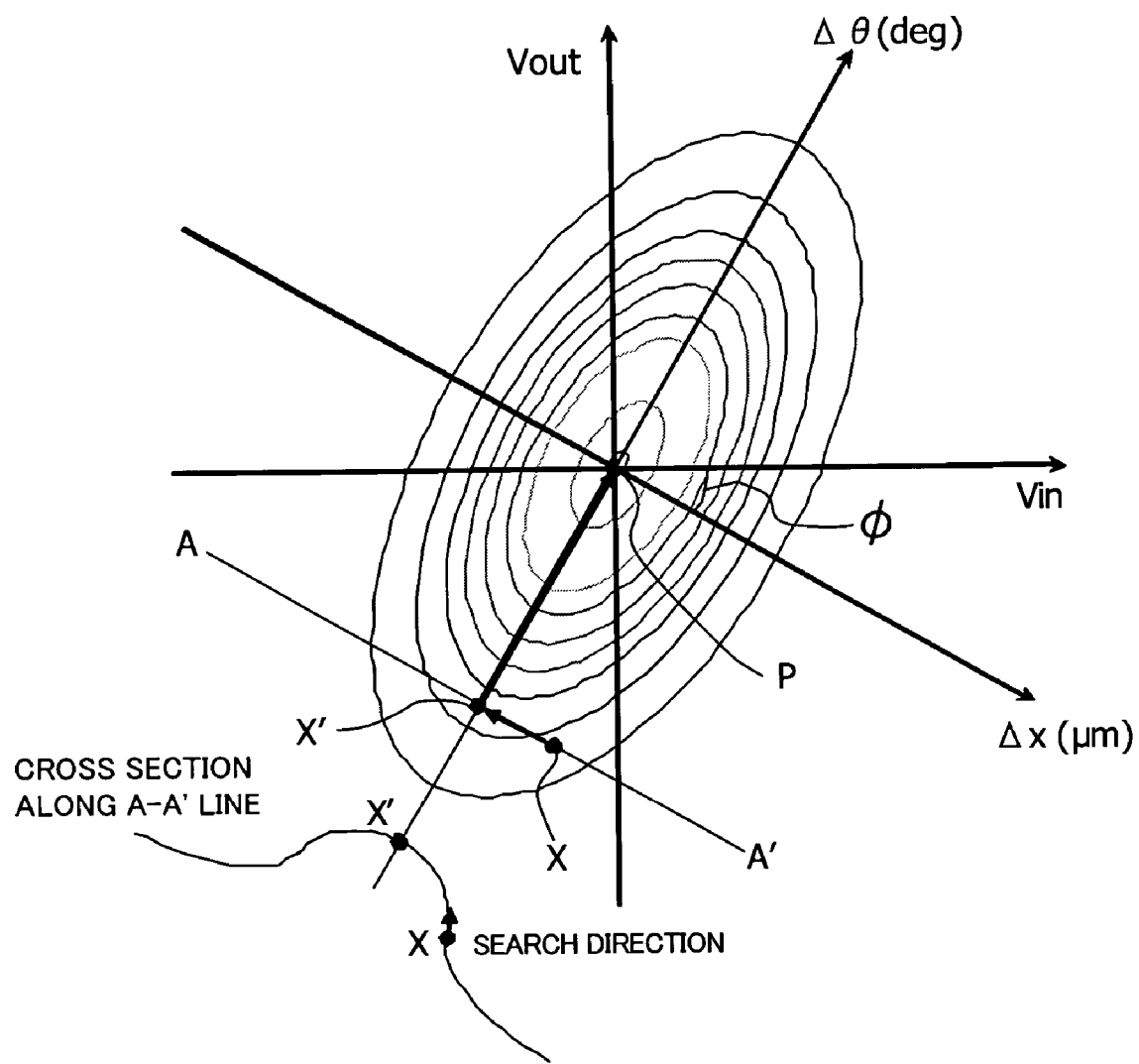
FIG. 4 is a diagram illustrating the contour map of optical coupling efficiency for explanation of a method for control of the optical switch of this embodiment.

On the other hand, when the abnormality has not been detected in the monitored optical output power (in case of YES at step S5), the process is transferred to subsequent feedback control (in this case, a search start point is assumed to be located at a point X, as shown in FIG. 4). That is, first, applied voltages to the prism pairs 503a, 505a are increased by a voltage corresponding to Δxunit (step S6); and a received power level (A/D value) after the voltage increase is detected (step S7). In this case, the control section 5 will simultaneously output ΔVin and ΔVout, both of which are given by the aforementioned equation (3).

As a result, when the A/D value corresponding to the received power level increases (in case of YES at step S8), it is determined that the current search direction is a correct direction (an arrow from point X to point X' in FIG. 4) and the applied voltage is further increased by a voltage of Δxunit (step S9). On the contrary, when the A/D value decreases (in case of NO at step S8), it is determined that the current search direction is incorrect and Δx is decreased by a voltage of Δxunit (or, a voltage greater than Δxunit (e.g., 2Δxunit)) (step S12).

After that, a number of repetitions of Δxunit increase (YES route at step S10 or step S13, and at step S11 or S14) is performed until the A/D value begins to decrease (until NO is determined at step S11 or step S14); when the A/D value has decreased, the control along Δx axis is stopped (at the time point when the search point has reached the peak point X' in the cross-section taken along the line A–A' shown in FIG. 4) and the process is transferred to control along Δθ axis (step S15).

That is, first, Δθ is increased by Δθunit (step S16); and a received power level is detected (step S17). Also in this case, the control section 5 will simultaneously output ΔVin and ΔVout, both of which are given by the aforementioned equation (3). As a result, when the A/D value of the received power level increases (in case of YES at step S18), the control section 5 determines that the current search direction is a correct direction and further increases the Δθ by Δθunit (step S19).

On the contrary, when the A/D value of the received power level decreases (in case of NO at step S18), the control section 5 determines that the current search direction is incorrect and decreases Δθ by Δθunit (or, an amount larger than Δθunit (e.g., 2Δθunit)) (step S22).

After that, the control section 5 performs a number of repetitions of steps S19 through step S24 until the A/D value of the received power level begins to decrease (until NO is determined at step S21 or step S24) and when the A/D value has decreased, stops the control along the control axis (Δθ), and the search to find the peak point P is completed (NO route at step S21 or step S24).

As described above, according to this embodiment, when the optical switch 2 of the optical signal switching apparatus 1 is controlled so that the switching of optical paths between the optical deflection sections 2-1 and 2-2 takes place, the control axes (ΔVin, ΔVout) are converted to axes (Δx axis, Δθ axis) parallel to the major diameter and minor diameter of the ellipse on the aforementioned contour map applied voltages to the optical deflection sections 2-1, 2-2 are feedback-controlled along the obtained control axes (Δx axis, Δθ axis) and therefore, it can be concluded that the deflection characteristics of the respective optical deflection sections 2-1 and 2-2 are feedback-controlled in a parallel fashion (simultaneously). Accordingly, even when optimal values of control voltages for the optical switch 2 are displaced due to temperature drift, drift over time or the like, the time taken to find the peak point of the optical coupling efficiency is significantly reduced and rapid switching of optical paths can be achieved.

(B) Explanation of first modification

Figure 11:
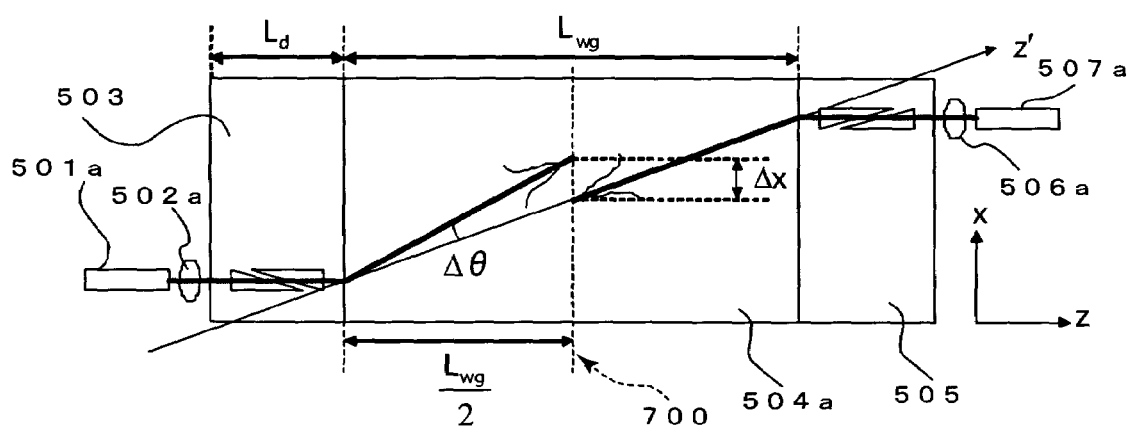
FIG. 11 is a diagram to explain how to compute optical coupling efficiency between input and output fiber optics based on a Gaussian beam model.

The gradient α of the ellipse on the optical coupling efficiency distribution map shown in FIG. 2 becomes 45 degrees just when the beam waist coincides with the optical reference plane 700 (refer to FIG. 11). That is, Δθ axis and Δx axis are inclined 45 degrees relative to Vin axis and Vout axis. This means that magnitudes of controlled variables ΔVin and ΔVout become equal to each other in the aforementioned equation (4). Accordingly, as shown by the following equations (9), (10), an applied voltage upon control along Δθ axis is represented by:

$$\Delta V\text{in} = \Delta V\text{out} = \Delta \theta \text{unit}/\sqrt{2} \tag{9}$$

and an applied voltage upon control along Δx axis is represented by:

$$\Delta V\text{in} = -\Delta V\text{out} = \Delta x \text{unit}/\sqrt{2} \tag{10}$$

That is, in this case, the control section 5 controls the deflection characteristics of the optical deflection section 2-1 on the incoming side and the deflection characteristics of the optical deflection section 2-2 on the outgoing side with the same controlled variable ratio (1:1) in a parallel fashion. Accordingly, the unit controlled variables (unit step width) Δxunit and Δθunit on Δx axis and Δθ axis are available in common and allow simplification of control and also reduction in capacity needed for the memory 7.

(C) Explanation of second modification

In the foregoing examples, although the controlled variables associated with feedback control, i.e., the step widths Δxunit and Δθunit are assumed constant, those variables may be variable. For example, when a point of interest becomes farther from the peak point P, the step width maintained by feedback control is made larger and when the point of interest becomes closer to the peak point P, the step width is made smaller, thus allowing feedback control to converge more quickly.

It should be noted that examples of information used to determine whether the point of interest is far or close relative to the peak point may include information about an absolute A/D values and information about the amount of change in A/D value per step. That is, when an A/D value at the peak point P can be predicted, the information about an absolute A/D values detected by the optical detection section 4 are classified into categories and the step width is weighted according to the categories. Further, when a profile of optical coupling efficiency can be predicted, the information about the amount of change (value of a difference between before and after change) in A/D value detected by the optical detection section 4 are classified into categories and the step width is weighted according to the categories.

(D) Explanation of third modification

In the control section 5, an ellipse approximation routine is performed based on the aforementioned contour map for the distribution of optical coupling efficiency and the major diameter A, minor diameter B, gradients α, β of the aforementioned ellipse can be determined based on the fitted ellipse. These values are determined for individual optical paths and stored in the memory 7, and information about those values can be referred at the time of switching of optical paths.

It should be noted that examples of the ellipse approximation routine may include a least-squares ellipse approximation routine. In general, an ellipse is given by the following expression (11) and in the least-squares ellipse approximation routine, approximation is done by using at least five coordinate data.

$$X^2 + axy + by^2 + cx + dy + e \quad (11)$$

In this case, the sum of square of the expression, $X_i^2 + ax_i y_i + by_i^2 + cx_i + dy_i + e$ (i=0, ..., n) is given by the following expression:

$$D(a, b, c, d, e) = \sum_{i=0}^{n} |x_i^2 + ax_i y_i + by_i^2 + cx_i + dy_i + e|^2$$

and because an error becomes minimum when the derivative of the sum of square becomes zero, individual coefficients can be determined by the following matrix equation.

$$\begin{pmatrix} \sum x_i^2 y_i^2 & \sum x_i y_i^3 & \sum x_i^2 y_i & \sum x_i y_i^2 & \sum x_i y_i \\ \sum x_i y_i^3 & \sum x_i^4 & \sum x_i y_i^2 & \sum y_i^3 & \sum y_i^2 \\ \sum x_i^2 y_i & \sum x_i y_i^2 & \sum x_i^2 & \sum x_i y_i & \sum x_i \\ \sum x_i y_i^2 & \sum y_i^3 & \sum x_i y_i & \sum y_i^2 & \sum y_i \\ \sum x_i y_i & \sum y_i^2 & \sum x_i & \sum y_i & 1 \end{pmatrix} \begin{pmatrix} a \\ b \\ c \\ d \\ e \end{pmatrix} =$$

$$\begin{pmatrix} -\sum x_i^3 y_i \\ -\sum x_i^2 y_i^2 \\ -\sum x_i^3 \\ -\sum x_i y_i^2 \\ -\sum x_i^2 \end{pmatrix}$$

In this manner, the control section 5 is able to determine the major diameter A, minor diameter B, gradients α, β of the ellipse based on the determined coefficients of the ellipse. That is, in this case, the control section 5 is capable of performing the ellipse approximation routine for the optical coupling efficiency map in the voltage coordinate system, determining a rotation angle of the ellipse and based on the results, performing computational analysis of a rotation angle and control step width. Note that such computational analysis is performed for the individual optical paths.

(E) Others

The invention is not limited to the foregoing embodiments and various modifications may be made without departing from the spirit and scope of the invention.

For example, in the above embodiments, while explanation has been made of a case where the invention is applied to an optical switch that uses an electro-optic effect, the same actions and effects as in the above embodiments can be obtained by applying the invention, for example, to a mechanical optical switch that uses micro mirrors made by MEMS.

Further, in the above embodiments, although the voltages ΔVin, ΔVout are simultaneously applied to the individual optical deflection sections 2-1, 2-2, these voltages are not necessarily applied simultaneously in a strict manner. The idea of the invention may be effective as long as both the voltages ΔVin and ΔVout are adjusted and then feedback-controlled to the corresponding sections based on the A/D values acquired by the optical detection section 4.

As described so far, according to the invention, feedback control is performed so that the individual optical deflection sections on the incoming and outgoing sides of the optical switch used in the light signal switching apparatus deflect light signals in a parallel fashion and therefore, even when optimal controlled variables for the optical switch are displaced due to temperature drift and/or drift over time, the time taken to find the optimal controlled variables can be significantly reduced and rapid switching of optical paths can be achieved. Accordingly, it can be concluded that the light signal switching apparatus of the invention largely contributes to improvement in performance, such as reliability of an optical communication system such as a WDM system and the usefulness of the invention is considered extremely high.

What is claimed is:

1. An optical signal switching apparatus comprising:
an optical switch including an incoming light deflector to deflect incoming light from a predetermined input port in an arbitrary direction and an outgoing light deflector to deflect outgoing light from said incoming light deflector in an arbitrary direction and couple the outgoing light to a predetermined output port,
a monitor to monitor optical coupling efficiency of the outgoing light into the output port, and
a controller to control deflection characteristics of said incoming light deflector and deflection characteristics of said outgoing light deflector in a parallel fashion so that the optical coupling efficiency monitored by said monitor is maximized.

2. The optical signal switching apparatus according to claim 1, wherein said controller includes:
a memory storing control map information indicative of a relationship between the optical coupling efficiency and individual controlled deflection variables corresponding to the incoming light deflector and the outgoing light deflector, respectively,
a control axis conversion section converting individual deflection control axes represented by said control map information, provided for the incoming light deflector and the outgoing light deflector, into control axes different from the deflection control axes, and
a control section controlling said incoming light deflector and said outgoing light deflector in a parallel fashion so that the optical coupling efficiency in a control axis coordinate system provided by said control axis conversion section is maximized.

3. The optical signal switching apparatus according to claim 2, wherein, in a case where a relationship between the individual controlled deflection variables that cause the optical coupling efficiency to be the same is indicated by the shape of an ellipse, which relationship is represented by said control map information, said control axis conversion section is configured to convert the individual deflection control axes into a major diameter axis and minor diameter axis of the ellipse.

4. The optical signal switching apparatus according to claim 3, wherein said control axis conversion section is configured to determine information about the major diameter axis and the minor diameter axis by performing an ellipse approximation routine on said control map information.

5. The optical signal switching apparatus according to claim 1, wherein said controller is configured to control the deflection characteristics of said incoming light deflector and the deflection characteristics of said outgoing light deflector with the same variable ratio in a parallel fashion.

6. The optical signal switching apparatus according to claim 2, wherein said controller is configured to control the deflection characteristics of said incoming light deflector and the deflection characteristics of said outgoing light deflector with the same variable ratio in a parallel fashion.

7. The optical signal switching apparatus according to claim 3, wherein said controller is configured to control the deflection characteristics of said incoming light deflector and the deflection characteristics of said outgoing light deflector with the same variable ratio in a parallel fashion.

8. The optical signal switching apparatus according to claim 4, wherein said controller is configured to control the deflection characteristics of said incoming light deflector and the deflection characteristics of said outgoing light deflector with the same variable ratio in a parallel fashion.

9. The optical signal switching apparatus according to claim 1, wherein said controller is configured to be able to change controlled variables corresponding to the incoming light deflector and the outgoing light deflector, respectively, in accordance with one of information indicative of an absolute value and information indicative of an amount of change of the optical coupling efficiency monitored by said monitor.

10. The optical signal switching apparatus according to claim 2, wherein said controller is configured to be able to change the controlled variables in accordance with one of information indicative of an absolute value and information indicative of an amount of change of the optical coupling efficiency monitored by said monitor.

11. The optical signal switching apparatus according to claim 3, wherein said controller is configured to be able to change the controlled variables in accordance with one of information indicative of an absolute value and information indicative of an amount of change of the optical coupling efficiency monitored by said monitor.

12. The optical signal switching apparatus according to claim 4, wherein said controller is configured to be able to change the controlled variables in accordance with one of information indicative of an absolute value and information indicative of an amount of change of the optical coupling efficiency monitored by said monitor.

13. The optical signal switching apparatus according to claim 5, wherein said controller is configured to be able to change controlled variables corresponding to the incoming light deflector and the outgoing light deflector, respectively, in accordance with one of information indicative of an absolute value and information indicative of an amount of change of the optical coupling efficiency monitored by said monitor.

14. The optical signal switching apparatus according to claim 6, wherein said controller is configured to be able to change the controlled variables in accordance with one of information indicative of an absolute value and information indicative of an amount of change of the optical coupling efficiency monitored by said monitor.

15. The optical signal switching apparatus according to claim 7, wherein said controller is configured to be able to change the controlled variables in accordance with one of information indicative of an absolute value and information indicative of an amount of change of the optical coupling efficiency monitored by said monitor.

16. The optical signal switching apparatus according to claim 8, wherein said controller is configured to be able to change the controlled variables in accordance with one of information indicative of an absolute value and information indicative of an amount of change of the optical coupling efficiency monitored by said monitor.

17. A controller for control of an optical switch, which includes incoming light deflection means to deflect incoming light from a predetermined input port in an arbitrary direction, and outgoing light deflection means to deflect outgoing light from said incoming light deflection means in an arbitrary direction and couple the outgoing light to a predetermined output port, comprising:
monitoring means to monitor optical coupling efficiency of the outgoing light into the output port, and
control means to control deflection characteristics of said incoming deflection means and deflection characteristics of said outgoing light deflection means, so that the optical coupling efficiency monitored by said monitoring means is maximized.

18. A method for control of an optical switch, which includes an incoming light deflector to deflect incoming light from a predetermined input port in an arbitrary direction, and an outgoing light deflector to deflect outgoing light from said incoming light deflector in an arbitrary direction, and couple the outgoing light to a predetermined output port, the method comprising:
monitoring optical coupling efficiency of the outgoing light into the output port, and
controlling deflection characteristics of said incoming light deflector and deflection characteristics of said outgoing light deflector so that the monitored optical coupling efficiency is maximized.

* * * * *